United States Patent [19]

Neuberger

[11] Patent Number: 5,203,896
[45] Date of Patent: Apr. 20, 1993

[54] PROCESS FOR PRODUCING HARD PLASTIC CLAD OPTICAL FIBER WITH IMPROVED ULTRAVIOLET TRANSMISSION

[75] Inventor: Wolfgang Neuberger, Monchen-Gladbach, Fed. Rep. of Germany

[73] Assignee: CeramOptec, Inc., Enfield, Conn.

[21] Appl. No.: 862,446

[22] Filed: Apr. 2, 1992

[51] Int. Cl.⁵ .............................................. G02B 6/02
[52] U.S. Cl. ..................................... 65/3.11; 65/3.43; 385/128
[58] Field of Search .............. 427/163, 165; 385/123, 385/126, 128; 65/3.1, 3.43, 3.11, 3.14, 3.4

[56] References Cited

U.S. PATENT DOCUMENTS

| | | | |
|---|---|---|---|
| 4,099,837 | 7/1978 | Vazirani | 427/163 |
| 4,125,644 | 11/1978 | Ketley et al. | 427/163 |
| 4,511,209 | 4/1985 | Skutnik | 350/96.34 |
| 4,707,076 | 11/1987 | Skutnik et al. | 427/163 |
| 4,884,866 | 12/1989 | Hashimoto et al. | 427/163 |
| 4,904,053 | 2/1990 | Kinaga et al. | 385/145 |

*Primary Examiner*—Frank Gonzalez
*Assistant Examiner*—John Ngo
*Attorney, Agent, or Firm*—Kenneth P. Glynn

[57] ABSTRACT

The present invention is directed to a process for producing hard clad optical fibers with improved ultraviolet transmission which includes drawing an optical fiber core while simultaneously coating the core with a photoinitiator-free, active energy ray curable composition and then introducing the coated core to a high energy ionizing radiation ray source so as to minimize exposure of the core to the ionizing radiation. The energy is less than 800 keV and preferably less than 200 keV. In one preferred embodiment, the energy is aimed at the coated core so as to pass therethrough at an angle of 45° or less. The resulting product from the process is also included in the present invention.

20 Claims, 1 Drawing Sheet

PROCESS FOR PRODUCING HARD PLASTIC CLAD OPTICAL FIBER WITH IMPROVED ULTRAVIOLET TRANSMISSION

BACKGROUND OF THE INVENTION

1. Field of the Invention

The present invention is directed to a process for producing hard plastic clad optical fiber with improved ultraviolet transmission. More specifically, it involves coating a core as it is being drawn with an active energy ray curable composition which is curable with energy below 800 keV and subsequently exposing the coated core to such radiation.

2. Prior Art Statement

In recent patents U.S. Pat. No. 4,511,209, 4,707,076 and 4,884,866 coatings and processes for achieving hard clad coatings for optical fibers have been described. In practice these hard coatings are valued for their ability to provide protection to the glass core while functioning as optical claddings. Being thin relative to the core enhances their core to clad fiber ratio and thus permits larger cores for medical applications which employ catheters of limited size or for bundle applications, medical or otherwise, where the efficiency of the bundle is increased by having more core area/bundle diameter. Being hard not only provides some protection for the glass core but also permits the use of crimp and cleave terminations as well as the pot and polish type, which may provide process or cost advantages.

As the use of optical fibers to carry laser energy in medical and in industrial applications has become accepted and valued, the trend for certain processes to be more efficient with higher frequency, i.e. shorter wavelength, radiation has raised a need for optical fibers with better transmission in the ultraviolet and near-ultraviolet regions of the electromagnetic spectrum. Heretofore the standard coatings/claddings described above were cured efficiently in-line on the fiber draw tower by the use of ultraviolet light with coatings/claddings containing ultraviolet initiators. The art for coating/curing protective coatings on optical fibers is described, for example, in U.S. Pat. Nos. 4,099,837 to Vazirani and 4,125,644 to A. D. Ketley et al.

The prior art initiators are highly ultraviolet absorbing species that either fracture or abstract a hydrogen atom from a neighboring molecule after absorbing the ultraviolet light, generating molecular radicals which then actively and very efficiently initiate polymerization and crosslinking in the bulk of the coating. Without the ultraviolet initiators, the coatings/claddings cure with great difficulty and certainly cannot cure fast enough within the bounds of the commercial fiber draw process to be useful compositions.

The presence of these ultraviolet initiators, which function by having strong ultraviolet absorptions, severely limits the transmission qualities of plastic clad optical fibers in the near ultraviolet and ultraviolet regions of the spectrum. In fact most current applications thus use glass-core/glass-clad type optical fibers for applications in these areas. Glass clad fibers are not the subject of the current patent, but suffice to note that there are certain advantages of plastic clad fibers that would make them desirable over the glass clad if their transmission in this region could be improved to near that of the glass clad fibers.

As noted in U.S. Pat. No. 4,884,866, compositions based on acrylates (methacrylates are to be understood as included in this term for the rest of this disclosure) can also be cured with other active energy rays such as electron beams or gamma rays. With these more energetic rays, the need for initiators may be reduced or eliminated. The problem with employing these rays is that such exposures of silica based optical fibers degrade the transmission of light throughout the spectrum—ultraviolet, visible and near infrared, as documented in a large and continually growing body of research on the effects of high energy ionizing radiation in optical fibers. (See e.g. D. L. Griscom, Phys. Rev. B40, 4224 (1989) and E. J. Friebele, et al J. Lightwave Technol. 6, 165 (1988).) Further, there are new studies directed to the detrimental effects of exposure of silica based optical fibers to intense ultraviolet lamps during the curing of the standard compositions. Results are inconclusive, but for a related silica glass used for containers and microscope slides, namely soda-lime glass, the darkening of the glass is quite similar for a given energy density deposition, regardless of whether by ultraviolet exposure or by electron beam exposure. Thus, prior art approaches to produce optical fibers, especially with the desirable hard plastic cladding here not easily yielded fibers with improved ultraviolet transmission, as are achieved by the present invention.

SUMMARY OF THE INVENTION

The present invention is directed to a process for producing hard clad optical fibers with improved ultraviolet transmission which includes drawing an optical fiber core while simultaneously coating the core with a photoinitiator-free, active energy ray curable composition and then introducing the coated core to a high energy ionizing radiation ray source so as to minimize exposure of the core to the ionizing radiation. The energy is less than 800 keV and preferably less than 200 keV. In one preferred embodiment, the energy is aimed at the coated core so as to pass therethrough at an angle of 45° or less. The resulting product from the process is also included in the present invention.

BRIEF DESCRIPTION OF THE DRAWINGS

The present invention is more fully understood when the specification herein is taken in conjunction with the illustration shown in FIG. 1. This is a schematic diagram of a typical system used in the present invention process.

DETAILED DESCRIPTION OF THE INVENTION

Figure 1:
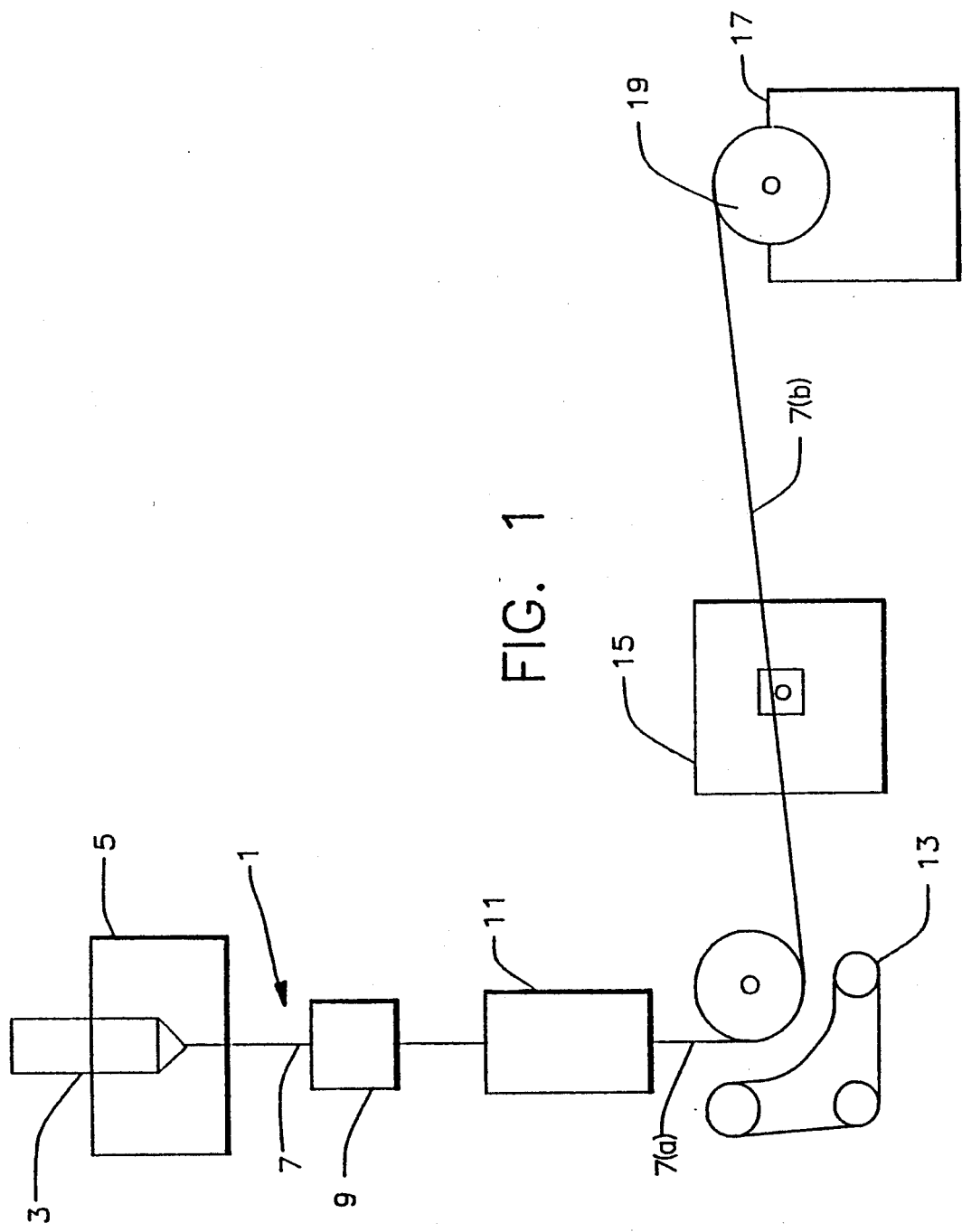

In the present invention it has been found that hard plastic clad optical fibers can be produced with increased ultraviolet transmission by curing a photoinitiator-free cladding composition with high energy ionizing rays which are directed towards the fiber so as to minimize the penetration into the fiber core, while still efficiently curing the cladding composition.

By employing specially designed high energy ionizing ray sources, e.g. the ultraviolet absorbing initiators, hereto found to be necessary for the fast, efficient curing of the hard plastic cladding compositions have now been eliminated. The present invention hard clad optical fibers with improved ultraviolet transmission may be used for many specialty fiber applications, such as medical laser surgery, process-wide and plant-wide local area networks and many military applications.

As employed in this invention, the high energy electrons should preferably be of lower than 200 keV energy or be introduced to the chamber, through which the freshly coated fiber passes, such that they approach the cladding/core interface in a way that minimizes their penetration into the fiber core.

As mentioned earlier, high energy ionizing rays, either gamma rays or electron beams, have been shown to damage silica when they pass through it. In optical fibers, this means that the transmission of the signal is attenuated more in irradiated fibers than in virgin fibers. All prior work would indicate that exposure of the optical fiber to doses of 2 kilorads or greater would create defects in the silica and thus decrease the fiber's performance. It is also well known that the most sensitive radiation curable compositions typically require 2 to 5 megarads of dose to achieve total cure, considerably above the threshold for damage.

In certain pure silica core fibers, the presence of optical power in the fiber during the radiation can aid recovery i.e. promote healing of the defects produced by the radiation exposure. This latter phenomenon is called the photobleaching effect. While this can diminish the induced attenuation in the fiber, as the exposure to the radiation increases the residual attenuation increment normally also increases.

Referring now to FIG. 1 and there is shown in system for a present invention process shown generally as system 1 having fiber preform 3, draw oven 5 and typical unclad fiber core 7 being drawn downwardly through coating applicator 9. Next, core 7 passes through a curing device 11 where the high energy ionizing rays are passed through to cure the coating so that the energy of the electrons is below 800 keV and preferably below 200 keV. Among the sources of high energy ionizing rays are electron accelerators, radioactive atoms, plasmas and corona discharges. The coated fiber 7(a) passes through capstan 13 and then through extruder 15 where it obtains a secondary coating as typically required. Take up drive and reel 17 and 19 coil the resulting fiber 7(b).

To illustrate the curing of photoinitiator-free cladding compositions by electron beam the following examples were prepared:

EXAMPLES 1 AND 2

Two compositions were mixed, coated onto microscope slides and then introduced to a 180 keV electron beam in an essentially oxygen-free atmosphere [<50 ppm $O_2$] on a plastic belt. At a belt speed of 20 fpm, a current of 5 milliamps yielded a dose of 5 megarads. Both compositions cured readily to tack-free, hard, optically clear coatings. It should be noted that the exposure to the electron beam was essentially perpendicular to the coated slide and in each case the glass slides colored from the damage introduced by the exposure to the high energy electrons.

TABLE I

| | |
|---|---|
| Example 1 Composition | |
| trihydroperfluoroundecyl acrylate | 72.9% |
| trimethylolpropane triacrylate | 25.0% |
| 3-methacryloxypropyltrimethoxy silane | 2.1% |
| Example 2 Composition | |
| trihydroperfluoroundecyl acrylate | 72.9% |
| trimethylolpropane trimethacrylate | 24.8% |
| 3-methacryloxypropyltrimethoxy silane | 2.3% |

Note that the only difference between the two compositions is the use a trimethacrylate in Example 2 in place of the triacrylate in Example 1. The results were that both cured equally fast under the Electron Beam exposure in contrast to ultraviolet initiated curing where it is normally observed that the acrylate function cures much faster than the methacrylate function.

EXAMPLES 3, 4 AND 5

To illustrate the detrimental effects of exposure of optical fibers to high energy ionizing rays to doses such as used to cure the cladding compositions given in Table I and to show how this invention could be applied, the following experiments were made. Optical fibers with pure silica cores but with different dimensions, and coating thicknesses were exposed to an electron beam—180 keV, 25 milliamps, 100 fpm, 5 megarads—essentially in a oxygen free atmosphere. The speed of 100 fpm was selected since this translates to ~30 meters/min, which is a common draw speed for larger core multimode optical fibers such as the ones irradiated here. The details on the fibers are given in Table II below. This includes the fiber core/cladding/buffer dimensions and the attenuation of each fiber before and after irradiation.

TABLE II

| Fiber ID & Dimensions core/clad/buffer [μ] | loss prior dB/km | loss after dB/km | loss 2 wks. dB/km | loss 4 wks. dB/km |
|---|---|---|---|---|
| A 210/230/300 | 16 | 24 | 20 | 20 |
| B 400/500/600 | 11 | 14 | 13.25 | 12.5* |
| C 200/220/270 | 16 | 24 | 25 | 20.5* |

*powered for about 5 minutes by bright white light source, prior day to testing

To understand the significance of these results one needs to make use of the penetration ability of electron beams in unit density material and the specific gravity of the irradiated materials, i.e. the depth-dose profile and the specific gravities of all components are used to estimate the actual dose absorbed in the transmitting silica core of the fibers. Table III gives some depth-dose data for selected energy electron beams. The specific gravities of the materials used in optical fibers are given below.

TABLE III

| Energy [voltage] | 50% of surface dose unit density material | 20% of surface dose unit density material |
|---|---|---|
| 150 keV | 0.004" [102μ] | 0.006" [152μ] |
| 180 keV | 0.007" [178μ] | 0.010" [254μ] |
| 200 keV | 0.009" [229μ] | 0.012" [305μ] |

The cladding and buffer coatings for the fibers A, B, and C of Examples 3, 4 and 5 respectively all have specific gravities of above 1.1 while that of the fused silica core is 2.2. At 5 megarads [MR] surface dose the 50% and 20% levels correspond to 2.5 MR and 1 MR respectively.

The application of this information leads to the following explanation for the results observed in Table II. The dose distribution in each sample fiber after irradiation to 5 MR [surface dose] with 180 keV electrons is given in Table IV.

TABLE IV

| | 180 keV Electrons | | |
|---|---|---|---|
| Fiber | 2.5 MR/[μ] into core | 1 MR/[μ] into core | % core area at ≦1 MR |
| A | 58 | 93 | 1.3% |
| B | 31 | 65 | 45% |
| C | 63 | 98 | 0.04% |

Fibers A and C of Examples 3 and 5 were obviously irradiated to ≧1 MR over essentially their entire core, while Fiber B of Example 4 has a significant portion of its fiber core with less irradiation exposure. This is reflected by the much lower increase in attenuation for the latter fiber compared to the other two. A surprising observation, by combining these results with those given in Table II, is that when the % core area at ≦1 MR is about 45% or more there seems to be almost no residual increased attenuation in the fiber. Again it must be emphasized that the electron beam was perpendicular to the fiber core and the data in Table IV are based on that.

To demonstrate how lower energy electrons can minimize the attenuation increase for irradiated fibers, one can look at how the results in Table IV would have looked for irradiation with 150 keV electrons as shown below. The greatest gain is seen to be at for the thinner coated, smaller diameter core fibers. Indeed curing cladding compositions to hard, thin claddings is an extreme coating thickness example, namely coatings of only 5μ to 15μ thick. (Note, at much lower energies it is difficult to maintain a uniform dose distribution because of scattering of the electrons by the atmosphere between the beam exit and the fiber surface.)

TABLE V

| | 150 keV Electrons | | |
|---|---|---|---|
| Fiber | 2.5 MR [μ] into core | 1 MR [μ] into core | % core area at ≦1 MR |
| A | 24 | 47 | 31% |
| B | 0 | 19 | 82% |
| C | 29 | 52 | 23% |

To illustrate how bending the electrons, as they approach the coated fiber, would effect the deposition of dose into the fiber core the following equations have been developed with the aid of all the observations. The fiber core/clad interface is used as the axis of reference for the angular descriptions [see FIG. 1]. Sample calculations are made for Fiber A to compare with the 90 degree approach detailed in the previous Tables.

With 180 keV electrons approaching at an angle of 45 degrees, the 1 MR dose would reach into the core for 86μ leaving about 3.3% of the core area at ≦1 MR; better but still very small. Having the electrons approach at an angle of 30 degrees, the 1 MR dose is at 66μ and thus 14% of the core is at ≦1 MR. At 18 degrees 1 MR is reached at 35μ into the core and thus about 45% of the core is at ≦1 MR.

A general formula can be written, using the following defined symbols:

t = coating/cladding thickness;
$t_{ud}=(sp.\ gr.)_{cc} \times t$;
a = approach angle of electrons relative to the fiber core/clad interface;
$D_1$ = depth for 1 MR in unit density material at specified electron energy;
T = thickness of core glass irradiated to ≧1 MR;
$T_{ud}=(sp.\ gr.)_{fc} \times T$;
R = fiber core radius
(sp. gr.)$_{cc}$ = specific gravity of the coating/cladding
(sp. gr.)$_{fc}$ = specific gravity of the fiber core [fused silica = 2.2]

$$D_1 - \{t_{ud}/\sin a\} = T_{ud} \quad (1)$$

$$T = T_{ud}/(sp.\ gr.)_{fc} \quad (2)$$

$$\{(R-T)/R\}^2 \times 100 = \%\ \text{core at} \leq 1\ MR \quad (3)$$

With these formulas and the findings that at least 45% of the core area should be at 1 MR or less dose it is possible to predict the preferred angle of approach to cure a fluoroacrylate based cladding so as to minimize the damage to the core while curing the cladding. The specific gravity of the cladding would be ~1.5, that of the core 2.2 and the formula can be rearranged to solve for the angle a.

$$\sin^{-1}\{1.5*t/\{D_1-[1-(0.45)^{\frac{1}{2}}]*R*2.2\}\} = a \quad (4)$$

or $$a = \sin^{-1}\{1.5*t/(D_1-0.7242R)\}$$

by selecting a voltage of 150 keV [$D_1=152\mu$] and a cladding thickness of 10μ, the dependence on fiber core radius is given by $$a = \sin^{-1}\{15/(152-0.7242*R)\} \quad (5)$$

For a fiber core radius of 100μ 1 MR is reached at 28μ into the core, which represents ~45% of core area at ≦1 MR, when the angle of approach, a, is 12 degrees relative to the core/clad interface. For a fiber core radius of 200μ 1 MR is reached at 62μ into the core, which represents ~45% of core area at ≦1 MR, with the beam approaching perpendicular to the core/clad interface [i.e. a=90 degrees]. These results and some additional ones at higher energies, different cladding thickness and including 600μ diameter fiber, often used in surgical laser applications, are summarized in Table VI.

TABLE VI

| Preferred Angle of Approach - (a in degrees) | | |
|---|---|---|
| | t = 10μ | t = 15μ |
| 150 keV, $D_1$ = 152μ | | |
| R = 100μ | a = 12 | a = 18 |
| R = 200μ | a = 90 | a = 90 |
| R = 300μ | a = 90 | a = 90 |
| 180 keV, $D_1$ = 254μ | | |
| R = 100μ | a = 5.3 | a = 7.3 |
| R = 200μ | a = 8.8 | a = 13 |
| R = 300μ | a = 27 | a = 42 |

Some preliminary ultraviolet measurements were made on samples of the three fibers described earlier in Table II. All three fibers had thermally-cured claddings rather than uv-cured ones. Unirradiated samples were tested as well as the irradiated samples. The former are also compared with standard unirradiated fibers having ultraviolet-cured cladding, which demonstrates the advantage of keeping the cladding free of ultraviolet initiators. [Aside, the disadvantages of using thermally-cured claddings lie mainly in that they are generally too soft, and they cannot be cured quickly without introducing high stresses due to the high temperatures required for fast cures.] Table VII presents representative data from these tests. The irradiated samples were 5 meters long and were taken from the spools measured last in Table II, i.e. Fibers B and C had been powered as noted there.

TABLE VII

ULTRAVIOLET Transmission Results

| Fiber | Unirradiated | Irradiated |
|---|---|---|
| Wavelength where transmission is <<1% [attenuation >5 dB/m] | | |
| A | 265 nm | 330 nm |
| B | 250 nm | 265 nm |
| C | 265 nm | 320 nm |
| uv-clad standard | 280 nm | — |
| % Transmission for 5 m fiber sample at 330 nm | | |
| A | 22% | <1% |
| B | 35% | 22% |
| C | 22% | −2% |
| ultraviolet-clad standard | 10% | — |

In correlation with the results from the 850 nm measurements, the two irradiated Fibers A and C with nearly their entire fiber cores receiving $\geq 1$ MR of dose have ultraviolet transmission at 330 nm that decreases over 1 order of magnitude while the irradiated Fiber B with nearly 50% of its core below 1 MR has a decrease of only $\frac{1}{3}$ its original transmission at this wavelength. In a similar vein the point where the transmission drops well below 1%T is much less affected by the radiation for Fiber B than the other two. Comparing the ultraviolet-clad standard with Fiber C, whose fiber core radius is the same as that of the standard fiber, it is seen that the thermally-cured clad Fiber C is considerably more transmissive at 330 nm and has a somewhat lower point where the transmission drops well below 1%T.

In comparison with the prior art, this new process permits the removal of ultraviolet initiators while still employing fast efficient curing of the cladding composition. The detrimental nature of exposure to ionizing rays has been minimized. It has been unexpectedly found that by keeping the actual exposure of the fiber core area below 1 MR even the very thin coatings used in claddings can be cured by the ionizing rays in a practical system without significant decrease in the fiber's performance over the spectral region of interest, namely the near ultraviolet and visible regions.

The use of electron beams to cure the cladding provides other advantages over the more common curing techniques—ultraviolet curing or thermal curing—due to the capability of the electron source to vary the voltage and hence the penetration as well as the current of the beam and hence the density [number] of the electrons. This means the curing times can be changed/adjusted as the product is run without forcing changes in the drawing speeds which can be optimized for cost or other fiber properties independent of restrictions due to curing speed of the cladding composition chosen.

As will be apparent to persons skilled in the art, various modifications, adaptations and variations of the foregoing disclosure can be made without departing from the teachings of this invention.

What is claimed is:

1. A process for producing hard clad optical fibers with improved ultraviolet transmission which comprises:

(a) drawing an optical fiber core through a draw process and, as it is being drawn from the draw process, coating the core with an active energy ray curable composition having no photo initiators therein, which when cured, serves as a cladding such that the cladding meets the core at a core/cladding interface; and, (b) introducing the coated fiber core to high energy ionizing radiation rays such that $\geq 40\%$ of the coated fiber core cross-sectional area receives $\leq 1$ Mrad of radiation dose while curing the cladding.

2. The process of claim 1 wherein the high energy ionizing rays are aimed so as to approach the fiber and pass through the cladding in a primarily tangential path.

3. The process of claim 1 wherein the high energy ionizing rays are electron beams.

4. The process of claim 1 wherein the active energy ray curable composition yields a cured coating having a refractive index which is at least 0.01 unit less than that of the core.

5. The process of claim 4 wherein the active energy ray curable composition comprises a mixture of:
   (a) a highly fluorinated alkyl(meth)acrylate; and,
   (b) an acrylic based crosslinking compound.

6. The process of claim 5 wherein said composition includes a silica/polymer adhesion promotor.

7. The process of claim 4 wherein the active energy ray curable composition comprises a mixture of:
   (a) a highly fluorinated (meth)acrylate polymer;
   (b) a fluorine-containing (meth)acrylate;
   (c) a non-fluorine-containing mono(meth)acrylate; and,
   (d) a polyfunctional monomer containing at least two (meth)acryloyl groups in the molecule.

8. The process of claim 7 wherein said composition includes a silica/polymer adhesion promotor.

9. The process of claim 1 wherein the high energy ionizing rays approach the cladding/core interface at angles of 45 degrees or less relative to the fiber axis.

10. The process of claim 3 wherein the energy of the electrons is below 800 keV.

11. The process of claim 3 wherein the energy of the electrons is preferably below 200 kev.

12. The process of claim 3 wherein the approach of the electron beam to the fiber core is controlled by the use of an exterior field introduced into the irradiation zone.

13. The process of claim 3 wherein the electron beam is rastered into an energy chamber through which the optical fiber passes such that the approach by the rastered beam to the cladding/bore interface is not more than 45 degrees relative to the fiber axis.

14. An optical fiber formed by a process comprising:

(a) drawing an optical fiber core through a draw process and, as it is being drawn from the draw process, coating the core with an active energy ray curable composition having no photo initiators therein, which when cured, serves as a cladding such that the cladding meets the core at a cladding/core interface; and, (b) introducing the coated fiber to high energy ionizing radiation rays such that $\geq 40\%$ of the coated fiber core cross-sectional area receives $\leq 1$ Mrad of radiation dose while curing the cladding.

15. The optical fiber of claim 14 wherein the high energy ionizing rays are aimed so as to approach the fiber and pass through the cladding in a primarily tangential path.

16. The process of claim 14 wherein the high energy ionizing rays are electron beams.

17. The optical fiber of claim 14 wherein the active energy ray curable composition yields a cured coating having a refractive index which is at least 0.01 unit less than that of the core.

18. The optical fiber of claim 17 wherein the active energy ray curable composition comprises a mixture of:
   (a) a highly fluorinated alkyl(meth)acrylate; and,
   (b) an acrylic based crosslinking compound.

19. The optical fiber of claim 18 wherein said composition includes a silica/polymer adhesion promoter.

20. The optical fiber of claim 17 wherein the active ray curable composition comprises a mixture of
   (a) a highly fluorinated (meth)acrylate polymer;
   (b) a fluorine-containing (meth)acrylate;
   (c) a non-fluorine-containing mono(meth)acrylate; and,
   (d) a polyfunctional monomer containing at least two (meth)acryloyl groups in the molecule.

* * * * *